(12) United States Patent
McLean (10) Patent No.: US 9,141,636 B2
(45) Date of Patent: Sep. 22, 2015

(54) HOMING DATA

(71) Applicant: AppSense Limited, Warrington (GB)

(72) Inventor: Ian James McLean, Lymm (GB)

(73) Assignee: AppSense Limited, Warrington (GB)

(*) Notice: Subject to any disclaimer, the term of this patent is extended or adjusted under 35 U.S.C. 154(b) by 219 days.

(21) Appl. No.: 13/830,186

(22) Filed: Mar. 14, 2013

(65) Prior Publication Data

US 2014/0279872 A1    Sep. 18, 2014

(51) Int. Cl.
*G06F 17/30* (2006.01)

(52) U.S. Cl.
CPC ................. *G06F 17/30174* (2013.01)

(58) Field of Classification Search
None
See application file for complete search history.

(56) References Cited

U.S. PATENT DOCUMENTS

| | | | |
|---|---|---|---|
| 2012/0311091 A1* | 12/2012 | Dingler et al. | 709/219 |
| 2014/0033067 A1* | 1/2014 | Pittenger et al. | 715/751 |
| 2014/0053227 A1* | 2/2014 | Ruppin et al. | 726/1 |
| 2014/0181027 A1* | 6/2014 | Whitehead et al. | 707/639 |
| 2014/0188803 A1* | 7/2014 | James et al. | 707/638 |

OTHER PUBLICATIONS

"Online Data Backup—Offsite, Onsite, & Cloud—CrashPlan Backup Software", http://www.crashplan.com/, printed on May 13, 2013, 4 pages.
"Datallow", http://www.appsense.com/products/data/datanow, printed on May 8, 2013, 4 pages.
"File Streams", http://msdn.microsoft.com/en-us/library/windows/desktop/aa364404, printed on May 8, 2013, 4 pages.
"Ubuntu Manpage: attr—Extended attributes", http://manpages.ubuntu.com/manpages/lucid/man5/attr.5.html, printed on May 8, 2013, 2 pages.

* cited by examiner

*Primary Examiner* — Rehana Perveen
*Assistant Examiner* — Raheem Hoffler
(74) *Attorney, Agent, or Firm* — Wilmer Cutler Pickering Hale and Dorr LLP (57) ABSTRACT

Systems and methods are described for homing data. A computerized method of homing data includes embedding a first homing configuration within a first file on a host, intercepting an access attempt to the first file by the host, retrieving the first homing configuration embedded within the first file, determining a first data homing connector based on the first homing configuration, and synchronizing the first file through the first data homing connector with a first synchronization server based on the first homing configuration.

18 Claims, 7 Drawing Sheets

HOMING DATA

BACKGROUND

Synchronization servers or cloud storage services normally utilize client software on client devices to upload/download files to/from storage servers. Some client devices can communicate with multiple different synchronization or cloud storage servers. For example, some files on a client device can be synchronized with one synchronization server while other files on the client device can be synchronized with a different synchronization server. In this kind of scenario, one conventional approach is to separate the files on the client device so that the files synchronized with different servers are grouped into different folders in the file system. Files within each folder are synchronized with a single synchronization server, and the configuration of the synchronization server is stored against the root of the folder. Another conventional approach is to maintain a static list of files being synchronized and store the configuration of the synchronization servers in the list. These approaches usually lack flexibility and robustness and normally demand costly maintenance.

SUMMARY

In accordance with the disclosed subject matter, systems and methods are described for homing data.

Disclosed subject matter includes, in one aspect, a computerized method of homing data which includes embedding a first homing configuration within a first file on a host, intercepting an access attempt to the first file by the host, retrieving the first homing configuration embedded within the first file, determining a first data homing connector based on the first homing configuration, and synchronizing the first file through the first data homing connector with a first synchronization server based on the first homing configuration.

In some embodiments, the first homing configuration includes at least one of: an identity of a synchronization service, a type of the synchronization service, an identity of the first data homing connector, an address of the first synchronization server, and a remote path of the first file on the first synchronization server.

In some other embodiments, the computerized method of homing data further includes encrypting the first homing configuration.

In some other embodiments, the first homing configuration is transparent to users of the host.

In some other embodiments, the computerized method of homing data further includes initializing the first data homing connector.

In some other embodiments, the computerized method of homing data further includes caching the first data homing configuration.

In some other embodiments, the computerized method of homing data further includes embedding a second homing configuration within a second file on the host, wherein the first and second files are in the same location within a file system of the host, intercepting an access attempt to the second file by the host, retrieving the second homing configuration embedded within the second file, determining a second data homing connector based on the second homing configuration, wherein the first and second data homing connectors are different, and synchronizing the second file through the second data homing connector with a second synchronization server based on the second homing configuration, wherein the first and second synchronization servers are different.

In some other embodiments, the computerized method of homing data further includes embedding a second homing configuration within a second file on the host, wherein the first and second files are in different locations within a file system of the host, intercepting an access attempt to the second file by the host, retrieving the second homing configuration embedded within the second file, determining the first data homing connector based on the second homing configuration, and synchronizing the second file through the first data homing connector with the first synchronization server based on the second homing configuration.

Disclosed subject matter includes, in another aspect, a computer system for homing data which includes a host interface configured to interact with a host, a file access interceptor configured to intercept an access attempt to a first file by the host, a homing configuration manager configured to retrieve a first homing configuration embedded within the first file, a plurality of data homing connectors configured to synchronize files on the host with a plurality of synchronization servers, and a data homing switch configured to determine a first of the plurality of data homing connectors to be used to synchronize the first file with first of the plurality of synchronization servers.

In some embodiments, the first homing configuration includes at least one of: an identity of a synchronization service, a type of the synchronization service, an identity of the first data homing connector, an address of the first synchronization server, and a remote path of the first file on the first synchronization server.

In some other embodiments, the homing configuration manager is further configured to store the first homing configuration within the first file.

In some other embodiments, the homing configuration manager is further configured to encrypt the first homing configuration.

In some other embodiments, the first homing configuration is transparent to users of the host.

In some other embodiments, the data homing switch is further configured to initialize the first data homing connector.

In some other embodiments, the computer system for homing data further include a homing configuration cache configured to cache the first homing configuration.

In some other embodiments, the file access interceptor is further configured to intercept an access attempt to a second file by the host, the first and second files being in the same location within a file system of the host, the homing configuration manager is further configured to retrieve a second homing configuration embedded within the second file, the data homing switch is further configured to determine second of the plurality of data homing connectors to be used to synchronize the second file with second of the plurality of synchronization servers, the first and second data homing connectors being different, the first of the plurality of data homing connectors is configured to synchronize the first file with the first of the plurality of synchronization servers, and the second of the plurality of data homing connectors is configured to synchronize the second file with the second of the plurality of synchronization servers, the first and second synchronization servers being different.

In some other embodiments, the file access interceptor is further configured to intercept an access attempt to a second file by the host, the first and second files being in different locations within a file system of the host, the homing configuration manager is further configured to retrieve a second homing configuration embedded within the second file, and the data homing switch is further configured to determine the first of the plurality of data homing connectors to be used to synchronize the second file with the first of the plurality of synchronization servers.

Disclosed subject matter includes, in yet another aspect, a non-transitory computer readable medium having executable instructions operable to, when executed by a processor, cause the processor to embed a first homing configuration within a first file on a host, intercept an access attempt to the first file by the host, retrieve the first homing configuration embedded within the first file, determine a first data homing connector based on the first homing configuration, and synchronize the first file through the first data homing connector with a first synchronization server based on the first homing configuration.

In some embodiments, the executable instructions is further operable to, when executed by the processor, cause the processor to initialize the first data homing connector.

In some other embodiments, the executable instructions is further operable to, when executed by the processor, cause the processor to cache the first data homing configuration.

Various embodiments of the subject matter disclosed herein can provide one or more of the following capabilities. System and method for homing data can increase flexibility of file synchronization and cloud storage systems. Files being synchronized can reside in random and arbitrary locations in the file system of the client devices. System and method for homing data can also enhance robustness of file synchronization and cloud storage systems. Files being synchronized can be moved around within the file system and can also be moved or copied onto external devices. The need to create or update synchronization configurations when the files move can be eliminated. System and method for homing data can also reduce the cost of maintenance. The need to create or update synchronization configurations when the files being synchronized move can be eliminated.

These and other capabilities of embodiments of the disclosed subject matter will be more fully understood after a review of the following figures, detailed description, and claims.

DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the subject matter of the disclosed subject matter. In addition, it will be understood that the embodiments described below are only examples, and that it is contemplated that there are other systems and methods that are within the scope of the disclosed subject matter.

Embodiments of the disclosed subject matter can provide features for homing data, e.g., in a cloud storage environment. Using this homing data, a file itself can know where it is supposed to synchronize to, rather than depending on a folder it is in (e.g., a folder can synchronize with Dropbox without the need to be in a dedicated Dropbox folder). One exemplary scenario of homing data according to certain embodiments of the disclosed subject matter is following: Multiple files in different file folders on a host (e.g., a synchronization client) can be synchronized with the same synchronization server or cloud storage service. Each file can be embedded with its own homing configuration that indicates where/what the file is synchronized with. The homing configuration can be retrieved from the file when the file is accessed. A data homing connector on the host and a corresponding synchronization server can be determined based on the data homing configuration. The file can be synchronized with the determined synchronization server through the determined data homing connector. The file can be moved or copied onto arbitrary locations on the host or even off the host (e.g., on a removable storage device). There is typically no need to reconfigure any synchronization settings since the data homing configuration is embedded within the file itself and can be moved or copied along with the file. This approach can therefore increase flexibly, enhance robustness, and reduce maintenance cost. Other embodiments are within the scope of the disclosed subject matter.

Figure 1:
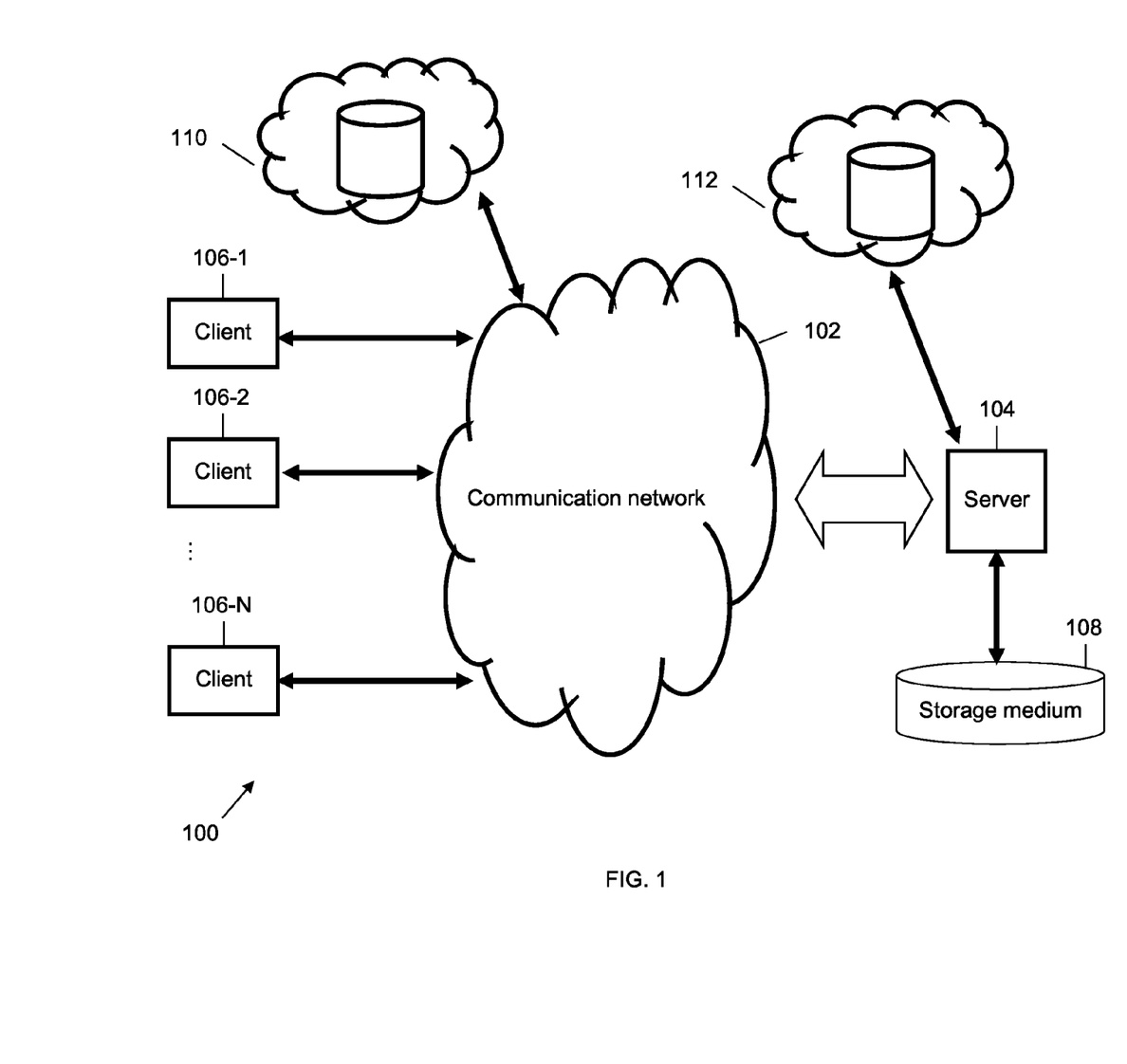
FIG. 1 illustrates an exemplary networked communication environment.

Embodiments of the disclosed subject matter can be implemented in a networked computing environment. FIG. 1 illustrates an exemplary networked communication environment 100 in accordance with certain embodiments of the disclosed subject matter. The networked communication environment 100 can include a server 104, at least one client 106 (e.g., client 106-1, 106-2, . . . 106-N), a physical storage medium 108, and cloud storage 110 and 112, which can all be coupled, directly or indirectly to a communication network 102.

Each client 106 can communicate with the server 104 to send data to, and receive data from, the server 104 across the communication network 102. Each client 106 can be directly coupled to the server 104; alternatively, each client 106 can be connected to server 104 via any other suitable device, communication network, or combination thereof. For example, each client 106 can be coupled to the server 104 via one or more routers, switches, access points, and/or communication network (as described below in connection with communication network 102). A client 106 can include, for example, a desktop computer, a mobile computer, a tablet computer, a cellular device, a smartphone, or any computing systems that are capable of performing computation.

Server 104 can be coupled to at least one physical storage medium 108, which can be configured to store data for the server 104. Preferably, any client 106 can store data in, and access data from, the physical storage medium 108 via the server 104. FIG. 1 shows the server 104 and the physical storage medium 108 as separate components; however, the server 104 and physical storage medium 108 can be combined together. FIG. 1 also shows the server 104 as a single server; however, server 104 can include more than one server. FIG. 1 shows the physical storage medium 108 as a single physical storage medium; however, physical storage medium 108 can include more than one physical storage medium. The physical storage medium 108 can be located in the same physical location as the server 104, at a remote location, or any other suitable location or combination of locations.

FIG. 1 shows two embodiments of a cloud storage 110 and 112. Cloud storage 110 and/or 112 can store data from physical storage medium 108 with the same restrictions, security measures, authentication measures, policies, and other features associated with the physical storage medium 108. FIG. 1 shows the cloud storage 112 separate from the communication network 102; however, cloud storage 112 can be part of communication network 102 or another communication network. The server 104 can use only cloud storage 110, only cloud storage 112, or both cloud storages 110 and 112. While, FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. FIG. 1 shows the network 102 as a single network; however, the network 102 can include multiple interconnected networks listed above.

Figure 2:
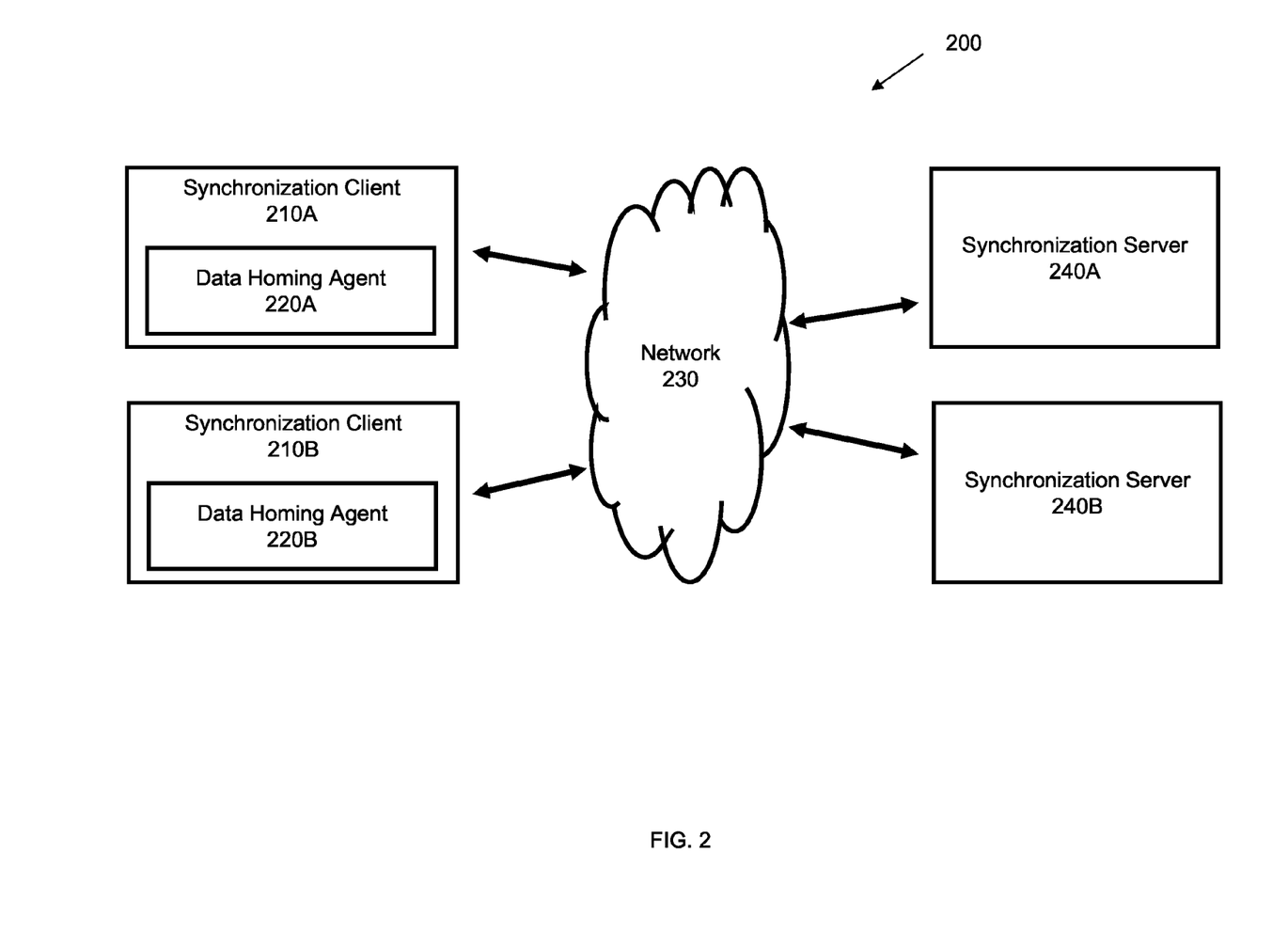
FIG. 2 illustrates an exemplary data homing arrangement.

FIG. 2 illustrates an exemplary data homing arrangement 200 according to certain embodiments of the disclosed subject matter. The data homing arrangement 200 can include one or more synchronization clients 210A and 210B, one or more synchronization servers 240A and 240B, and a network 230. Each synchronization client 210A or 210B can include a data homing agent 220A or 220B. The synchronization clients 210A and 210B and the synchronization servers 240A and 240B can be directly or indirectly coupled to the network 230 and communicate among each other via the network 230, which can be wired, wireless, or a combination of both.

The synchronization client 210A or 210B, like each client 106 illustrated in FIG. 1, can include a desktop computer, a mobile computer, a tablet computer, a cellular device, a smartphone, or any computing systems that are capable of performing computation. The synchronization server 240A or 240B can also include a desktop computer, a mobile computer, a tablet computer, a cellular device, a smartphone, or any computing systems that are capable of performing computation. Although FIG. 2 shows the synchronization server 240A or 240B as a single server, the synchronization server 240A or 240B can include more than one physical and/or logical servers. The network 230, like the communication network 102 illustrated in FIG. 1, can include the Internet, a cellular network, a telephone network, a computer network, a packet switching network, a line switching network, a local area network (LAN), a wide area network (WAN), a global area network, a corporate network, an intranet, a virtual network, or any number of private networks currently referred to as an Intranet, and/or any other network or combination of networks that can accommodate data communication. Such networks can be implemented with any number of hardware and software components, transmission media and network protocols. FIG. 2 shows the network 230 as a single network; however, the network 230 can include multiple interconnected networks listed above.

Each synchronization client 210A or 210B can include a data homing agent 220A or 220B. The data homing agent 220A or 220B can be embedded inside the synchronization client 210A or 210B as a software module, a hardware component, or a combination of both (described more fully below). Alternatively, the data homing agent 220A or 220B can also be separate from but coupled to the synchronization client 210A or 210B. The synchronization client 210A or 210B can communicate with the synchronization server 240A or 240B directly or via its data homing agent 220A or 220B.

Figure 3:
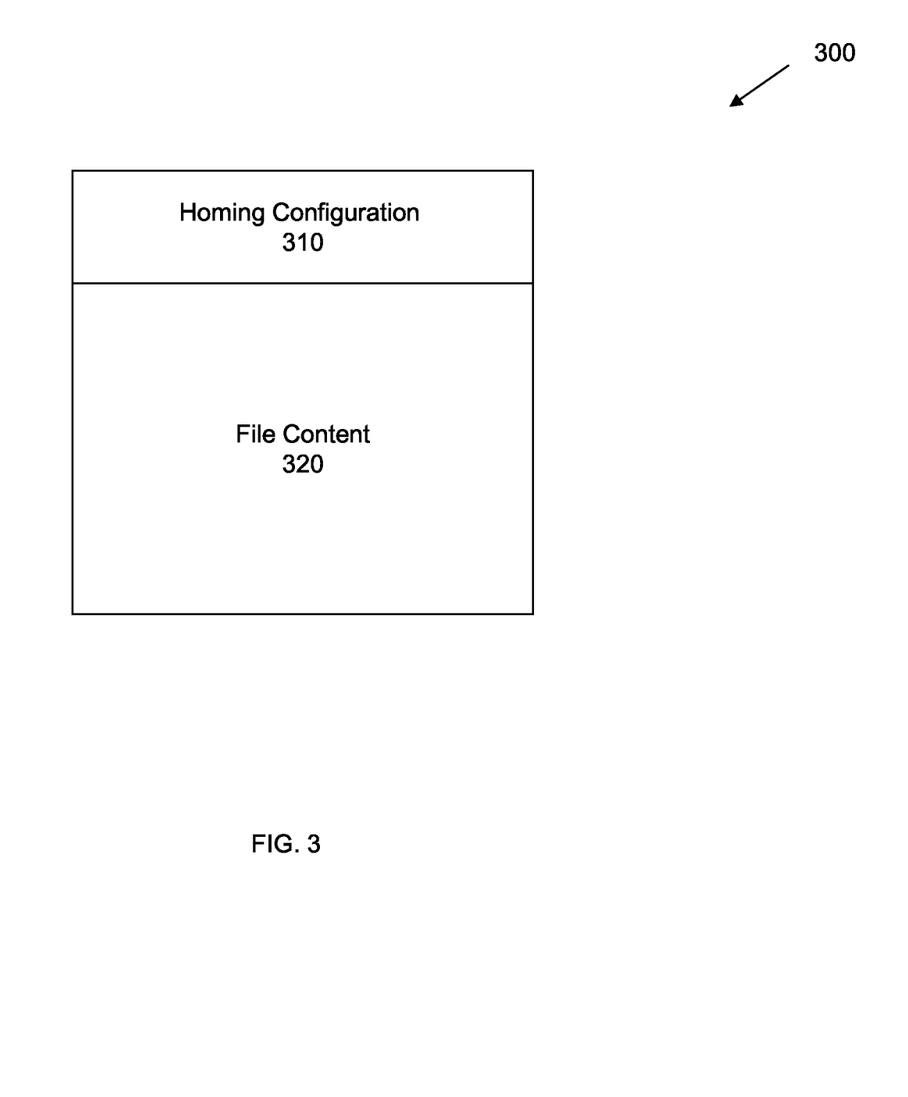
FIG. 3 illustrates the structure of an exemplary file.

FIG. 3 illustrates the structure of an exemplary file 300 according to certain embodiments of the disclosed subject matter. The file 300 can reside in a host. The file 300 can include a homing configuration 310 and a file content 320.

The homing configuration 310 can be embedded within the file 300 as part of the file's metadata and/or connected to the file 300 in some other manner (e.g., using a lookup table). In some embodiments, the homing configuration 310 can be part of the header of the file 300. The homing configuration 310 can indicate the identity or type of synchronization service (e.g., Datallow, SkyDrive, Dropbox, etc.), identify a data homing connector (e.g., data homing connector 1, 2, or 3, etc.), specify the address of a synchronization server, and/or define the remote path of the file on the synchronization server. In some embodiments, the homing configuration 310 can be encrypted. In some embodiments, the homing configuration 310 can be transparent to users of the host (e.g., homing configuration appears invisible to regular users). In some embodiments, the homing configuration 310 can be moved or copied when the file 300 is moved or copied to a different location within or outside a file system of the host.

Figure 4:
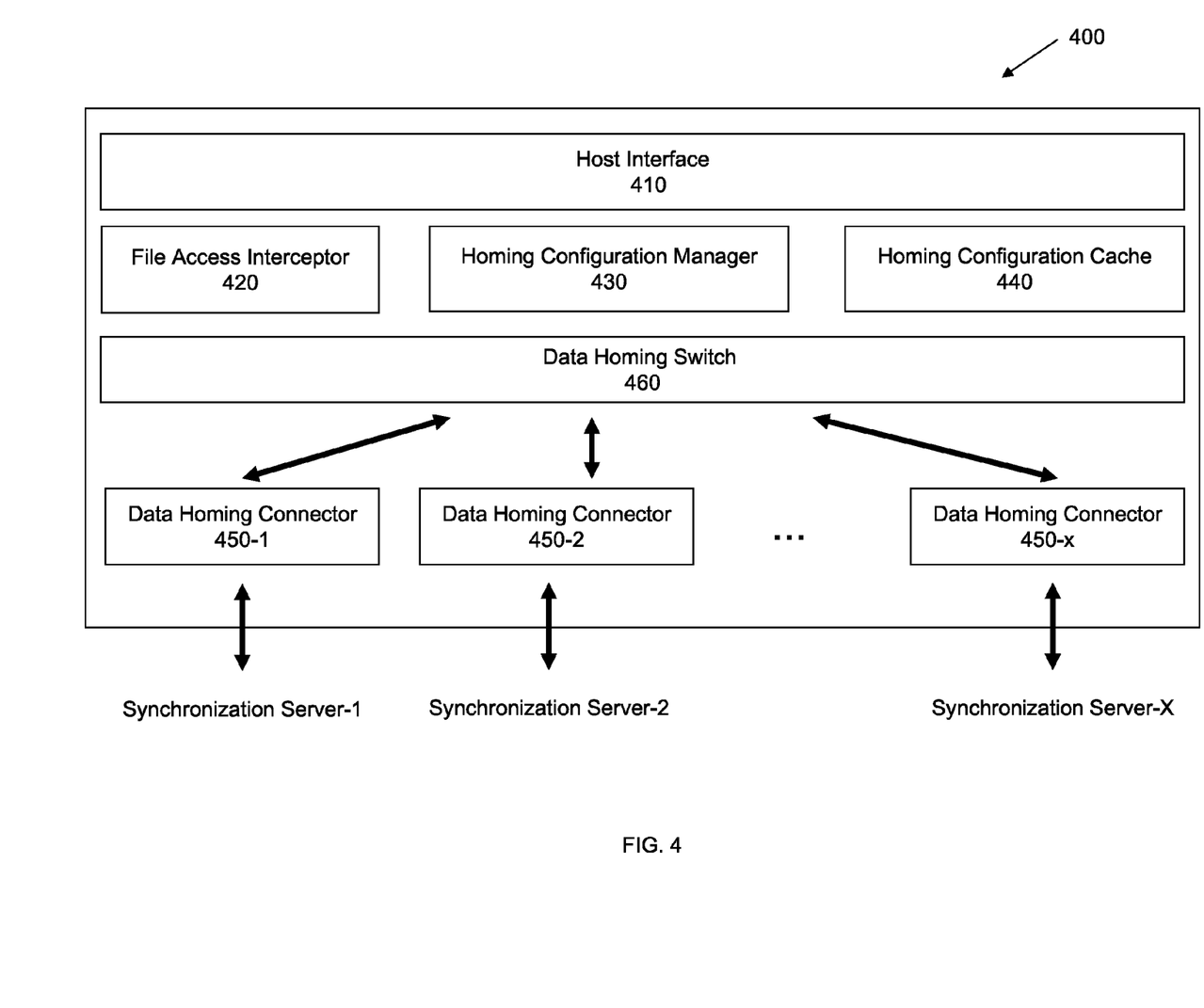
FIG. 4 illustrates a block diagram of an exemplary data homing agent.

FIG. 4 illustrates a block diagram of an exemplary data homing agent 400 according to certain embodiments of the disclosed subject matter. The data homing agent 400 can include a host interface 410, a file access interceptor 420, a homing configuration manager 430, a homing configuration cache 440, one or more data homing connectors 450-1, 450-2, . . . 450-x, and a data homing switch 460. The data homing agent 400 can include additional modules, fewer modules, or any other suitable combination of modules that perform any suitable operation or combination of operations.

The host interface 410 can interact with the host (e.g., synchronization client 210A or 210B) of the data homing agent 400. The data homing agent 400 can access the resources (e.g., user interface, file system, storage, etc.) on the host via the host interface 410.

The file access interceptor 420 can intercept access attempts to files that are configured to be synchronized with a synchronization server (e.g., synchronization server 240A or 240B). The file access interceptor 420 can monitor file access requests, such as file read or file write, to these files. The file access can originate from various sources, such as the host (e.g., synchronization client 210A or 210B). Once the file access interceptor 420 intercepts a file access request, it can trigger other components of the data homing agent 400 to perform appropriate functions. In some embodiments, the file access can be temporarily blocked. In one example, if the request is for data which is on the remote server, the request can be blocked until the data is available. In another example, if the flow of data is in the other direction (i.e. a change has occurred on the client which needs to be uploaded to the server), the event notifying the driver that this has happened (probably a file close event) can proceed uninterrupted and the file could be uploaded in the background.

The homing configuration manager 430 can store and retrieve homing configurations to/from the files which can be on or off the host. The homing configuration manager 430 can store or embed a homing configuration within the file, on demand or automatically. In one example, the homing configuration manager 430 can create a homing configuration from a default homing configuration and then customize the homing configuration based on user requests or based on a system policy, and then insert the created homing configuration into a file that does not yet contain a homing configuration. In another example, the homing configuration manager 430 can update the existing homing configuration within a file. The homing configuration manager 430 can also retrieve a homing configuration from a file, on demand or automatically. In one example, the homing configuration manager 430 can retrieve the homing configuration from a file once the file access interceptor 420 intercepts a file access to the file. In another example, the homing configuration manager 430 can retrieve the homing configurations from files periodically based on user or system settings. In some embodiments, when the homing configuration manager 430 tries to retrieve a homing configuration from a file and finds none, the homing configuration manager 430 can generate a homing configuration 310 and store it in and/or associate it with the file. In some embodiments, the homing configuration manager 430 can encrypt the homing configuration in a file using various encryption mechanisms.

The homing configuration cache 440 can cache homing configurations. Caching homing configurations can increase performance and lower response time of the data homing agent 400 or the synchronization clients 210A or 210B. The homing configuration of a file can be cached in the homing configuration cache 440 when the homing configuration of the file is retrieved or stored the first time. The homing configuration cache 440 can be updated periodically based on a time-out or can be updated on-demand. The home configuration manager 430 can be configured to use or not to use the home configuration cache 440 when storing or retrieving homing configurations. In some embodiments, the home configuration cache 440 can be memory-based and can reside in a memory of the data homing agent 400 or the host (e.g., a synchronization client 210A or 210B).

The data homing connectors 450-1 ... 450-x can communicate with one or more synchronization servers and synchronize files on the host with the one or more synchronization servers. Each data homing connector (e.g., 450-1) can be coupled with one or more synchronization servers (e.g., Synchronization Server-1 and/or Synchronization Server-2). Each synchronization server (e.g., Synchronization Server-1) can be coupled with one or more data homing connectors (e.g., 450-1 and/or 450-2). The data homing connectors 450-1 ... 450-x can be physical and/or logical connections. Each data homing connector can use a specific communication protocol (e.g., HTTP) to request different operations from the synchronization servers or other cloud storage servers. The data homing connectors can present the same API internally to the data homing switch 460 switch, such as "upload file," "download file," and "list files," etc.

The data homing switch 460 can determine the data homing connector(s) to be used based on the homing configuration of a file. As discussed earlier, a homing configuration can indicate the identity or type of service (e.g., DataNow, SkyDrive, Dropbox, etc.), identify a data homing connector, specify the address of the synchronization server, and/or define the remote path of the file on the synchronization server. The data homing switch 460 can interpret a homing configuration (e.g., 310) and identify one or more corresponding data homing connectors (e.g., 450-1). The data homing switch 460 can determine a data homing connector directly when the homing configuration identifies the data homing connector. Alternatively, the data homing switch 460 can determine a data homing connector indirectly if the homing configuration identifies the identity/type of synchronization service or specifies the address of the synchronization server. In some embodiments, the data homing switch 460 can also initialize the one or more data homing connectors if needed.

Figure 5:
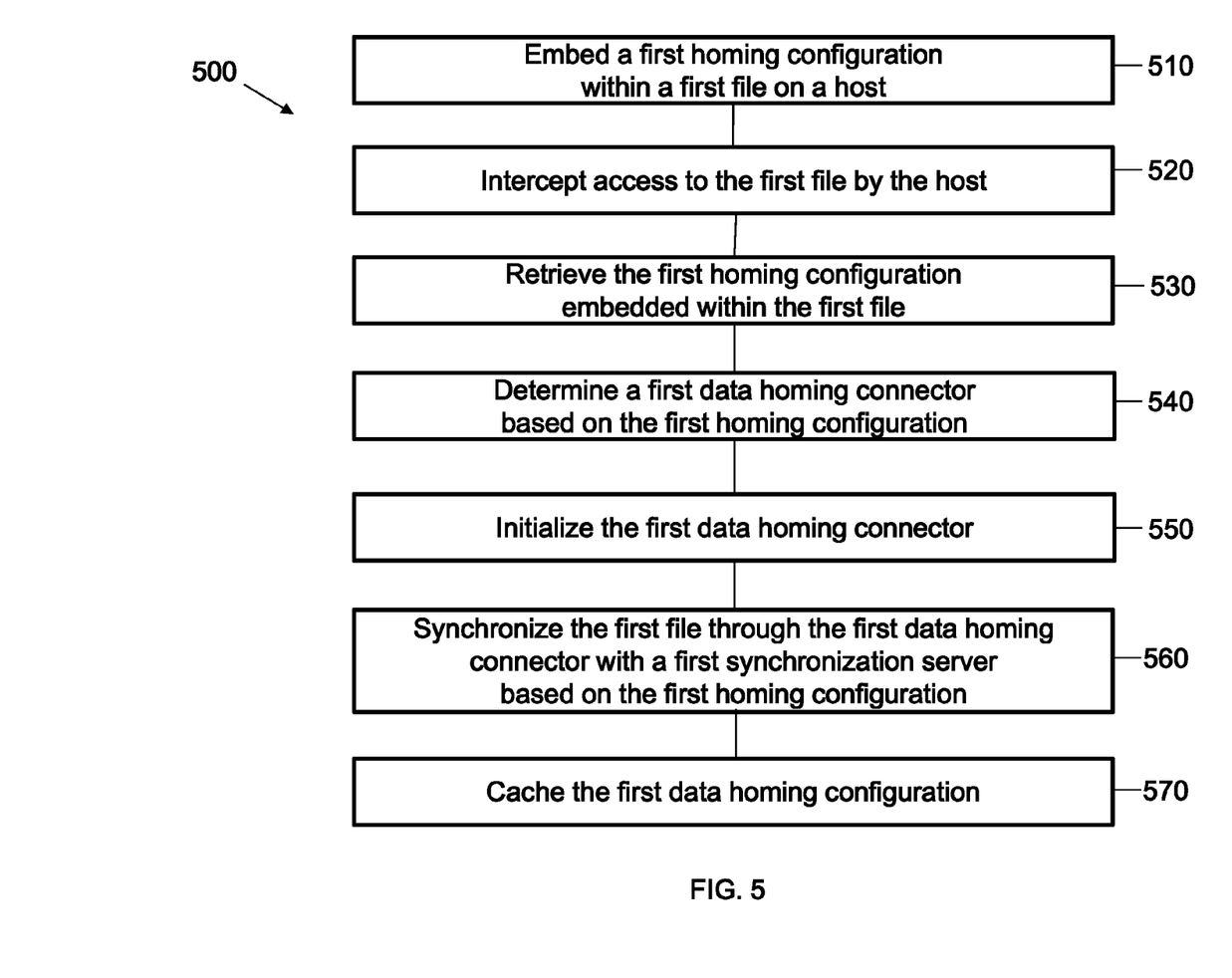
FIG. 5 illustrates an exemplary process of homing data.

FIG. 5 illustrates an exemplary process 500 of homing data according to certain embodiments of the disclosed subject matter. The process 500 can be modified by, for example, having stages rearranged, changed, added and/or removed.

At stage 510, a first homing configuration can be embedded within a first file on the host. The first homing configuration can be stored, e.g., by the homing configuration manager 430, on demand or automatically. In one example, a homing configuration can created from a default homing configuration and then customized for fit the needs. In another example, an existing homing configuration can be updated, e.g., by the homing configuration manager 430, periodically or on demand.

At stage 520, an access request for the first file by the host can be intercepted. The file access, such as file read or file write, can be monitored, e.g., by the file access interceptor 420. The file access can originate from various sources, such as the host (e.g., synchronization client 210A or 210B).

At stage 530, the first homing configuration embedded within the first file can be retrieved. The first homing configuration can be retrieved from a file, e.g., by the homing configuration manager 430. The first homing configuration can be retrieved from a file on demand or automatically.

At stage 540, a first data homing connector is determined based on the first homing configuration. As discussed earlier, a homing configuration can indicate the identity or type of service (e.g., DataNow, SkyDrive, Dropbox, etc.), identify a data homing connector, specify the address of the synchronization server, and/or define the remote path of the file on the synchronization server. The first data homing connector can be determined directly when the first homing configuration identifies a data homing connector. Alternatively, the first data homing connector can be determined indirectly if the first homing configuration identifies the identity/type of synchronization service or specifies the address of the synchronization server.

At stage 550, the first data homing connector is initialized. The first data homing connector can be initialized by the data homing switch 460 if needed. During initialization, the data homing connector can be configured with the address of the synchronization server it will be connecting to and can then authenticate itself to the synchronization server. For example, the data homing connector can transmit a username/password to the synchronization server and receive a session token in reply. In addition, there can also be exchange of security information, such as a key to encrypt the connection between the data homing connector and the synchronization server.

At stage 560, the first file is synchronized through the first data homing connector with a first synchronization server based on the first homing configuration. As discussed earlier, a homing configuration can specify the address of the synchronization server and/or define the remote path of the file on the synchronization server. The first synchronized server can be determined by the first data homing connector or by the data homing switch 460.

At stage 570, the first data homing configuration can be cached. Caching homing configurations can increase performance and lower response time of the data homing agent 400. The first data homing configuration can be cached in the homing configuration cache 440. In some embodiments, the home configuration cache 440 can be memory-based and can reside in a memory of the data homing agent 400 or the host.

Figure 6:
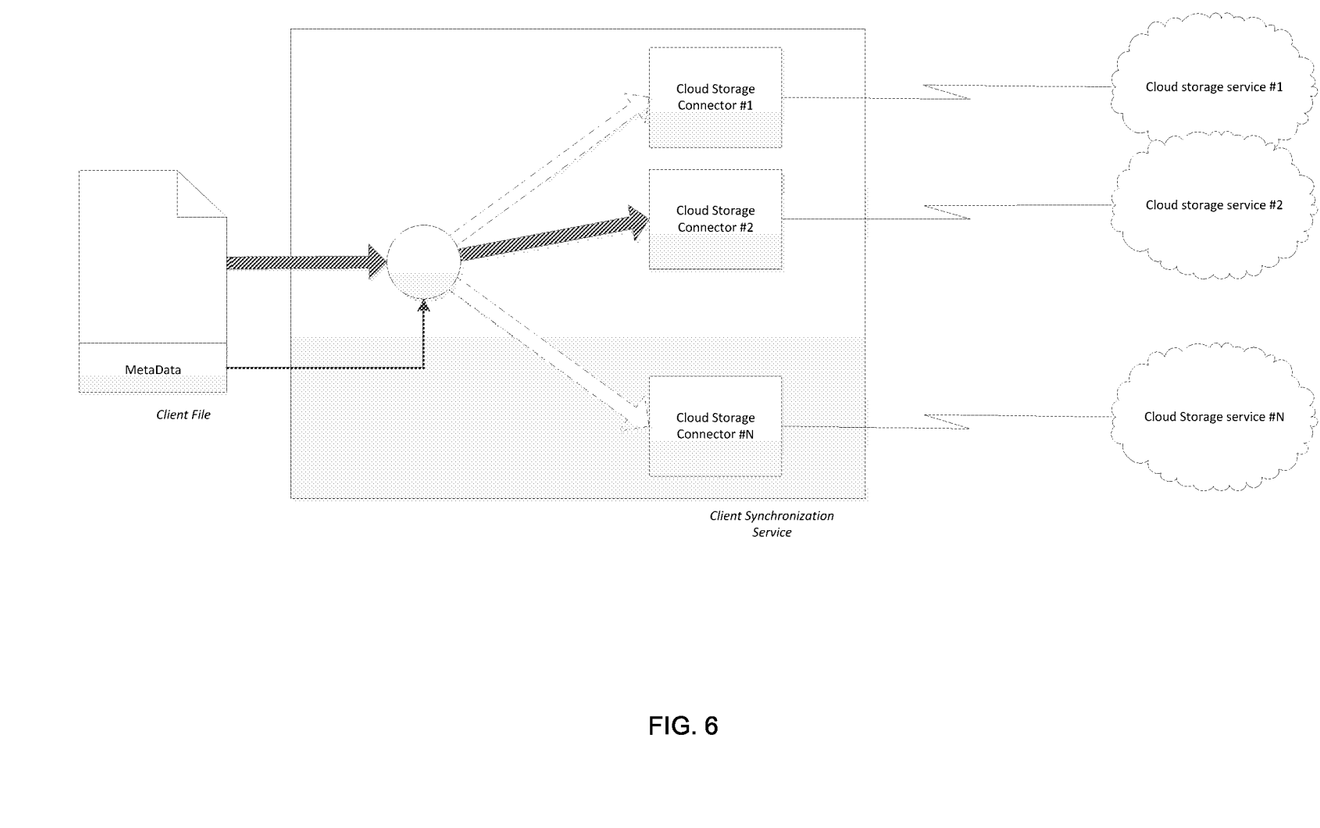
FIG. 6 includes another exemplary illustration of homing data.

According to embodiments of the disclosed subject matter, the homing configuration of a file being synchronized can be closely associated with the file itself (e.g., embedded within the file). The close association or embedment can allow the homing configuration to be moved or copied along with the file itself. This can allow individualized homing configuration, ease maintenance burden, and enhance flexibility and robustness. FIG. 6 includes another exemplary illustration of homing data.

In one exemplary scenario, two files (file A and file B) reside in one location (e.g., folder) in the host's file system. File A is embedded with a homing configuration A; file B is embedded with a homing configuration B. When an access to file A is intercepted, homing configuration A can be retrieved from file A, and data homing connector A can be selected based on homing configuration A. Data homing connector A can communicate with synchronization server A to synchronize file A. In the meantime, when an access to file B is intercepted, homing configuration B can be retrieved from file B, and data homing connector B can be selected based on homing configuration B. Data homing connector B can communicate with synchronization server B to synchronize file B. This setup can allow files within one folder to be synchronized with different synchronization servers or cloud services. For example, multiple files to be synchronized can be placed in one folder—some files synchronized with AppSense DataNow cloud storage service while the rest files synchronized with Microsoft SkyDrive cloud storage service—without maintaining a separate list of synchronization settings (e.g., defining which files are synchronized with which cloud storage service).

In another exemplary scenario, two files (file C and file D) reside in different locations (e.g., folders) in the host's file system. File C can be embedded with a homing configuration C; file D can be embedded with a homing configuration D. When an access to file C is intercepted, homing configuration C can be retrieved from file C, and data homing connector X can be selected based on homing configuration C. Data homing connector X can communicate with synchronization server X to synchronize file C. In the meantime, when an access to file D is intercepted, homing configuration D can be retrieved from file D, and the same data homing connector X can be selected based on homing configuration D. Data homing connector X can communicate with the same synchronization server X to synchronize file D. This setup can allow files in different folders to be synchronized with the same synchronization server or cloud service. For example, multiple files in different system directories can be synchronized with a same cloud service (e.g., an AppSense User Virtualization server).

In another exemplary scenario, file E is synchronized with a synchronization server E through data homing connector E. File E can be copied or moved to other location (e.g., folder) on the file system and stay synchronized with synchronization server E, without the need to reconfigure any synchronization settings. File E can also be copied or moved onto a removable storage medium (e.g., a USB thumb drive) and stay synchronized with synchronization server E, without the need to reconfigure any synchronization settings. In addition, file E can also be copied or moved from the removable storage medium (e.g., a USB thumb drive) to another host device and stay synchronized with synchronization server E, without the need to reconfigure any synchronization settings.

Figure 7:
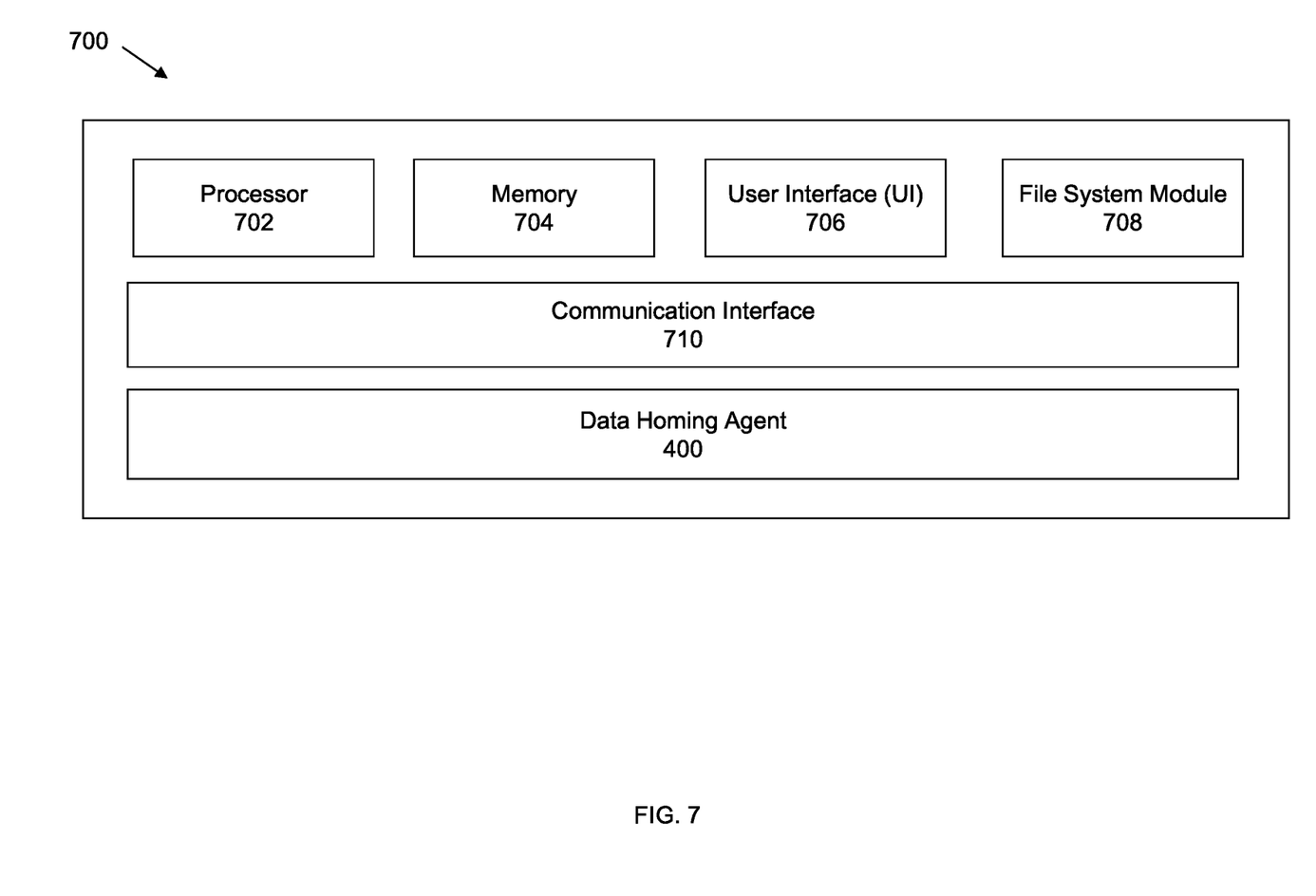
FIG. 7 illustrates a block diagram of an exemplary synchronization client.

FIG. 7 illustrates a block diagram of an exemplary synchronization client 700 according to certain embodiments of the disclosed subject matter. The synchronization client 700 can serve as, for example, a client 106 in the networked communication environment 100 or a synchronization client 210 or 210B in data homing arrangement 200. The synchronization client 700 can include at least one processor 702 and at least one memory 704. The processor 702 can be hardware that is configured to execute computer readable instructions such as software. The processor 702 can be a general processor or be an application specific hardware (e.g., an application specific integrated circuit (ASIC), programmable logic array (PLA), field programmable gate array (FPGA), or any other integrated circuit). The processor 702 can execute computer instructions or computer code to perform desired tasks. The memory 704 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The synchronization client 700 can also optionally include a user interface (UI) 706, a file system module 708, and a communication interface 710. The UI 706 can provide an interface for users to interact with the synchronization client 700 in order to access the data homing arrangement 200. The file system module 708 can be configured to maintain a list of all data files, including both local data files and remote data files, in every folder in a file system. The file system module 708 can be further configured to coordinate with the memory 704 to store and cache files/data. The communication interface 710 can allow the synchronization client 700 to communicate with external resources (e.g., a network or a remote client/server). The synchronization client 700 can also include a data homing agent 400. The description of the data homing agent 400 and its functionalities can be found in the discussion of FIGS. 1-6. The synchronization client 700 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions.

What is claimed is:
1. A computerized method of homing data, comprising:
  embedding a first homing configuration within a first file on a host;

intercepting an access attempt to the first file by the host;
retrieving the first homing configuration embedded within the first file;
determining a first data homing connector based on the first homing configuration;
synchronizing the first file through the first data homing connector with a first synchronization server based on the first homing configuration;
embedding a second homing configuration within a second file on the host, wherein the first and second files are in the same location within a file system of the host;
intercepting an access attempt to the second file by the host;
retrieving the second homing configuration embedded within the second file;
determining a second data homing connector based on the second homing configuration, wherein the first and second data homing connectors are different; and
synchronizing the second file through the second data homing connector with a second synchronization server based on the second homing configuration, wherein the first and second synchronization servers are different.

2. The computerized method of claim 1, wherein the first homing configuration includes at least one of: an identity of a synchronization service, a type of the synchronization service, an identity of the first data homing connector, an address of the first synchronization server, and a remote path of the first file on the first synchronization server.

3. The computerized method of claim 1, further comprising encrypting the first homing configuration.

4. The computerized method of claim 1, wherein the first homing configuration is transparent to users of the host.

5. The computerized method of claim 1, further comprising initializing the first data homing connector.

6. The computerized method of claim 1, further comprising caching the first data homing configuration.

7. The computerized method of claim 1, further comprising:
embedding a third homing configuration within a third file on the host, wherein the first and third files are in different locations within a file system of the host;
intercepting an access attempt to the third file by the host;
retrieving the third homing configuration embedded within the third file;
determining the first data homing connector based on the third homing configuration; and
synchronizing the third file through the first data homing connector with the first synchronization server based on the third homing configuration.

8. A computer system for homing data, the system comprising:
a plurality of synchronization servers;
a host computer comprising:
a non-transitory data storage medium operable to store files in a file system, and
one or more processors operable to access files over a network, to access files in the file system, and to write files to the data storage medium;
wherein the host computer is in network communication with each of the plurality of synchronization servers;
a host interface configured to interact with the host computer and further configured to intercept an access attempt to a second file by the host computer, the first and second files being in the same location within the file system;
a file access interceptor configured to intercept an access attempt to a first file by the host computer;
a homing configuration manager configured to retrieve a first homing configuration embedded within the first file and further configured to retrieve a second homing configuration embedded within the second file;
a plurality of data homing connectors configured to synchronize files on the host computer with the plurality of synchronization servers; and
a data homing switch configured to determine a first of the plurality of data homing connectors to be used to synchronize the first file with a first of the plurality of synchronization servers and further configured to determine a second of the plurality of data homing connectors to be used to synchronize the second file with a second of the plurality of synchronization servers, the first and second data homing connectors being different;
wherein the first of the plurality of data homing connectors is configured to synchronize the first file with the first of the plurality of synchronization servers;
and wherein the second of the plurality of data homing connectors is configured to synchronize the second file with the second of the plurality of synchronization servers, the first and second synchronization servers being different.

9. The computer system of claim 8, wherein the first homing configuration includes at least one of: an identity of a synchronization service, a type of the synchronization service, an identity of the first data homing connector, an address of the first synchronization server, and a remote path of the first file on the first synchronization server.

10. The computer system of claim 8, wherein the homing configuration manager is further configured to store the first homing configuration within the first file.

11. The computer system of claim 8, wherein the homing configuration manager is further configured to encrypt the first homing configuration.

12. The computer system of claim 8, wherein the first homing configuration is transparent to users of the host.

13. The computer system of claim 8, wherein the data homing switch is further configured to initialize the first data homing connector.

14. The computer system of claim 8, further comprising a homing configuration cache configured to cache the first homing configuration.

15. The computer system of claim 8, wherein
the file access interceptor is further configured to intercept an access attempt to a third file by the host, the first and third files being in different locations within a file system of the host;
the homing configuration manager is further configured to retrieve a third homing configuration embedded within the third file; and
the data homing switch is further configured to determine the first of the plurality of data homing connectors to be used to synchronize the third file with the first of the plurality of synchronization servers.

16. A non-transitory computer readable medium having executable instructions operable to, when executed by a processor, cause the processor to:
embed a first homing configuration within a first file on a host;
intercept an access attempt to the first file by the host;
retrieve the first homing configuration embedded within the first file;
determine a first data homing connector based on the first homing configuration;

synchronize the first file through the first data homing connector with a first synchronization server based on the first homing configuration;

embed a second homing configuration within a second file on the host, wherein the first and second files are in the same location within a file system of the host;

intercept an access attempt to the second file by the host;

retrieve the second homing configuration embedded within the second file;

determine a second data homing connector based on the second homing configuration, wherein the first and second data homing connectors are different; and synchronize the second file through the second data homing connector with a second synchronization server based on the second homing configuration, wherein the first and second synchronization servers are different.

17. The non-transitory computer readable medium of claim 16, wherein the executable instructions is further operable to, when executed by the processor, cause the processor to initialize the first data homing connector.

18. The non-transitory computer readable medium of claim 16, wherein the executable instructions is further operable to, when executed by the processor, cause the processor to cache the first data homing configuration.

* * * * *